No. 701,700. Patented June 3, 1902.
J. H. L. & G. A. W. FOLKERS.
DEVICE FOR FILING SAWS.
(Application filed Feb. 13, 1902.)
(No Model.)
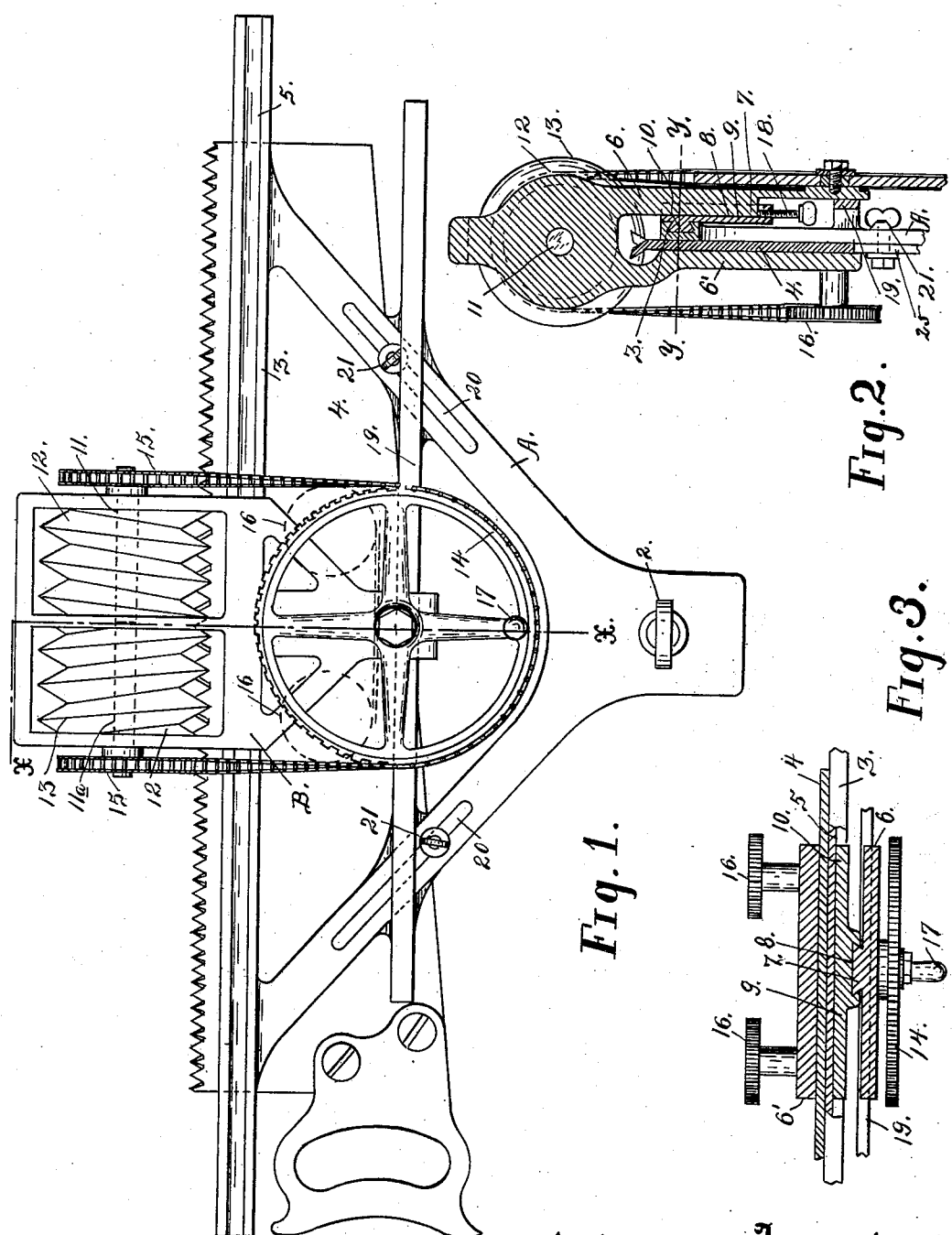

UNITED STATES PATENT OFFICE.

JOHN H. L. FOLKERS AND GEORGE A. W. FOLKERS, OF OAKLAND, CALIFORNIA.

DEVICE FOR FILING SAWS.

SPECIFICATION forming part of Letters Patent No. 701,700, dated June 3, 1902.

Application filed February 13, 1902. Serial No. 93,866. (No model.)

*To all whom it may concern:*

Be it known that we, JOHN H. L. FOLKERS and GEORGE A. W. FOLKERS, citizens of the United States, residing in the city of Oakland, county of Alameda, State of California, have invented an Improvement in Devices for Filing Saws; and we hereby declare the following to be a full, clear, and exact description of the same.

Our invention relates to improvements in saw filing and sharpening machines of the type employing rotary file members.

It consists of the parts and the constructions and combinations of parts hereinafter described and claimed.

Figure 1 is a side view of our improved device for filing saws. Fig. 2 is a sectional view taken on the line $x\ x$ of Fig. 1. Fig. 3 is a sectional view taken on the line $y\ y$ of Fig. 2.

A represents a frame, rigidly secured, as at 2, to any suitable support and having a horizontal guide-bar 3, against which the saw 4 is held by any suitable means. The bar 3 is provided with a longitudinal groove 5. The bar is preferably of a length greater than that of the saw to be sharpened in order to allow the filing-carriage B to operate the entire length of the saw. The carriage B has two members 6 6', adapted to straddle the saw. The member 6 has a vertical dovetailed guide 7, fitting a similarly-shaped groove 8 in a plate 9. This plate in turn has a horizontal or transverse tongue 10 on its opposite side, which is held and slidable in the groove 5 of the bar 3. The carriage B has the two alined independently-rotatable shafts 11 11$^a$, upon which are mounted the rotary file members 12. The abrading spiral surfaces 13 of these members engage alternate teeth, as shown, and each member is adapted to sharpen the teeth skipped by the other member. The bevel of the teeth will vary according to the pitch of the surfaces 13. By causing these members to rotate in opposite directions the carriage will move from end to end of the saw, and each tooth will be successively engaged and sharpened. The rotation of these members is effected by means of a sprocket-wheel 14, mounted on the member 6 of the carriage, and by a chain or equivalent engaging this wheel and passing over sprockets 15 on the ends of the shafts 11 11$^a$ and thence around the sprockets 16, secured on the member 6'. The sprocket-wheel 14 is made to revolve by a crank 17 or by any other suitable means.

In order to regulate properly the depth of the interdental cut, a screw 18 is threaded in the plate 9 and is adapted to bear on the end of the tongue 7. By adjusting this screw the carriage is moved vertically in relation to the saw and the filing members engage the teeth accordingly.

The lower end of the member 6 of the filing-carriage is supported in its travel at its lower end by means of the horizontal guide 19, fixed to the frame below and parallel with the bar 3 and serving to resist the lateral pressure of the lower portion of the carriage.

The arms of the frame A are slotted, as at 20. In these slots are the screws 21, on which the lower edge of the saw is adjustably supported, or said edge may rest upon plates 25, carried by the screws, as shown in Fig. 2.

Having thus described our invention, what we claim, and desire to secure by Letters Patent, is—

1. A device for filing and sharpening saws consisting in the combination of a frame adapted to be rigidly secured to a support, a horizontal guide-bar against which the side portion of the saw is to be held, a filing-carriage straddling said saw and reciprocable along said guide and having oppositely-rotatable filing members adapted to engage the teeth of the saw, and a bar below the guide, parallel therewith and serving as a lateral support for the lower portion of the carriage.

2. A device for filing saws, consisting in the combination of a stationary frame having guides against which the saw is adapted to be held, a filing-carriage movable longitudinally of said frame, filing members adapted to engage the teeth of the saw and a chain-and-sprocket mechanism including sprockets on the outer ends of the filing members, a sprocket disposed in a plane below and between said first-named sprockets and a chain passing around both sets of sprockets by which said members are rotated.

3. A device for filing saws, consisting in the combination of a stationary frame, having a horizontal guide-bar against which the saw is adapted to be held, a filing-carriage reciprocable along and held to said guide, filing members adapted to engage the saw-teeth, and a chain-and-sprocket mechanism by which said members are rotated in opposite directions, said mechanism including a main power-wheel journaled in the lower portion and in the central vertical plane of the carriage, wheels fixed to the outer ends of the filing members, and an endless flexible connection passing around the power-wheel and the wheels on the filing members.

4. A device for filing saws, consisting in combination of a frame, a horizontal bar thereon, a longitudinal groove in said bar, a carriage straddling said bar, means upon the carriage engaging said groove, a second bar below and parallel with the grooved bar and serving as a lateral support for the forked portion of the carriage, independently-rotatable file members having helical abrading-surfaces, sprocket-wheels upon opposite sides of the carriage, other sprocket-wheels upon the shafts of said file members and a chain passing around and over said sprockets.

5. A device for filing saws, consisting in combination of a frame, a horizontal guide-bar thereon, having a longitudinal groove, a plate having a projection engaging said groove and slidable therein, a carriage supported on and movable with said plate and vertically adjustable in relation thereto, a bar below the guide-bar, parallel therewith and serving as a lateral support for the lower portion of the carriage, rotatable file members, and chain-and-sprocket mechanism by which said members are driven.

In witness whereof we have hereunto set our hands.

JOHN H. L. FOLKERS.
GEORGE A. W. FOLKERS.

Witnesses:
S. H. NOURSE,
JESSIE C. BRODIE.